| United States Patent [19] | [11] Patent Number: 4,696,804 |
|---|---|
| Shinoda et al. | [45] Date of Patent: Sep. 29, 1987 |

[54] METHOD FOR TREATING $SO_2$, $SO_3$ AND DUST SIMULTANEOUSLY

[75] Inventors: Naoharu Shinoda; Atsushi Tatani; Masakazu Onizuka; Susumu Okino, all of Hiroshima; Taku Shimizu, Tokyo, all of Japan

[73] Assignee: Mitsubishi Jukogyo Kabushiki Kaisha, Japan

[21] Appl. No.: 821,608

[22] Filed: Jan. 23, 1986

[30] Foreign Application Priority Data

Feb. 5, 1985 [JP] Japan .................................. 60-19270

[51] Int. Cl.$^4$ .............................................. C01B 17/00
[52] U.S. Cl. ...................................... 423/242; 423/555
[58] Field of Search .......... 423/242 A, 244 A, 244 R, 423/242 R, 555

[56] References Cited

U.S. PATENT DOCUMENTS 3,929,968 12/1975 Taub ..................................... 423/242
4,487,784 12/1984 Kuroda et al. ...................... 423/242

FOREIGN PATENT DOCUMENTS 51-12026 4/1976 Japan .
52-10838 3/1977 Japan .
57-63117 4/1982 Japan .

OTHER PUBLICATIONS

"Mitsubishi Heavy Industrial Technical Bulletin", vol. 10, No. 5, (1973), pp. 211–218.

*Primary Examiner*—Gregory A. Heller
*Attorney, Agent, or Firm*—Toren, McGeady & Associates

[57] ABSTRACT

Here is disclosed a method for treating $SO_2$, $SO_3$ and a dust simultaneously which comprises causing an exhaust gas containing at least $SO_2$, $SO_3$ and the dust to pass through a dry dust collector in order to remove most of the dust therefrom, delivering the exhaust gas to a gas absorbing device, and using at least one of calcium hydroxide and calcium carbonate as an absorbent in the gas absorbing device to remove $SO_2$ and the dust, which has passed through the dry dust collector, in the exhaust gas therefrom, the method being characterized by comprising the steps of blowing air into an absorbing solution fed to the gas absorbing device in order to oxidize the absorbing solution and to thereby form a gypsum therein; separating a part of the absorbing solution into a slurry mainly containing the gypsum grains and a slurry mainly containing the dust; obtaining the by-product gypsum from the slurry mainly containing the gypsum grains; adding an alkali to the slurry mainly containing the dust; spraying this slurry into the exhaust gas on the upstream side of the dry dust collector; carrying out the collection, drying and solidification of $SO_3$; and collecting the resultant solid together with the dust by the dry dust collector.

6 Claims, 3 Drawing Figures

METHOD FOR TREATING $SO_2$, $SO_3$ AND DUST SIMULTANEOUSLY

BACKGROUND OF THE INVENTION

1. Field of the Invention

The present invention relates to a method for treating $SO_2$, $SO_3$ and a dust by combining a dry dust collector with a wet lime gypsum process exhaust gas desulfurizing apparatus for treating an exhaust gas containing $SO_2$, $SO_3$ and the dust.

2. Description of the Prior Art

At present, the most prevalent apparatus for desulfurizing an exhaust gas is an exhaust gas desulfurizing apparatus which makes use of a so-called wet lime process for carrying out the desulfurization of the exhaust gas by the use of $CaCO_3$ or $Ca(OH)_2$ as an absorbent in order to recover $SO_2$ in the exhaust gas in the forms of calcium sulfite and calcium sulfate (gypsum). Such a type of apparatus is described in detail in Japanese Patent Provisional Publication No. 63117/1982 and many other publications.

Now, reference will be made to the exhaust gas desulfurizing apparatus using the wet lime process which is widely employed on an industrial scale of late, in accordance with FIG. 2.

An exhaust gas 1 from, for example, a coal-fired boiler is treated in a denitrating device, an air heater and a dry dust collector, and the exhaust gas 1 containing the dust which has passed through the dry dust collector, $SO_3$ and $SO_2$ is then guided to an absorbing tower 2.

At the lower portion of the absorbing tower 2, a tank 3 for receiving a slurry in which calcium compounds are suspended is provided, and a stirrer 4 provided in the tank 3 stirs the slurry to prevent a solid from precipitating.

The slurry in which the calcium compound is suspended is delivered to the top of the tower 2 by means of a circulating pump 5, is then sprayed into the tower 5, flows down while brought into contact with the exhaust gas, and returns to the tank 3 again.

The exhaust gas from which $SO_2$, has been removed by the contact with the slurry is discharged as a purified gas 7 through a mist eliminator 6.

On the other hand, the slurry of $CaCO_3$ of $Ca(OH)_2$ is fed to the tank 3 via a line 8 in compliance with an amount of absorbed $SO_2$, and the slurry containing calcium sulfite produced by an $SO_2$ absorption of the absorbent is delivered to an oxidizing tower 10 via a line 9.

Into the oxidizing tower 10, air 12 is blown through an air bubble generator 11 disposed at the bottom portion of the tower 10, and sulfuric acid is blown thereinto through a line 13, whereby calcium sulfite is oxidized to a gypsum and unreacted $CaCO_3$ or $Ca(OH)_2$ is converted into the gypsum.

The gypsum slurry going out from the oxidizing tower 10 is guided to a thickener 15 via a line 14, and the gypsum slurry which has been cocentrated therein is then delivered to a centrifugal separator 19 through a line 16, a tank 17 and a pump 18. In the separator 19, a gypsum 20 is formed, and a filtrate is delivered to a tank 21 and is further returned to the thickener 15 via a pump 22 and a line 23.

On the other hand, a supernatant liquid in the thickener 15 is introduced into a tank 25 through a line 24, and is then used partially for the sake of, for example, the regulation of the absorbent in the exhaust gas desulfurizing apparatus and the remaining supernatant liquid is drained simultaneously.

According to the process shown in FIG. 2, the dust (which has passed through the dry dust collector) contained in the exhaust gas 1 is caught in the absorbing solution, and is finally involved in the gypsum 20, which fact will deteriorate the quality of the gypsum. Thus, for the purpose of previously removing the dust in the exhaust gas therefrom, a cooling dust removing tower may be disposed on the upstream side of the absorbing tower. This system has widely been put into practice and is disclosed in, for example, Japanese Patent Publication Nos. 10,838/1977 and 12,026/1976.

The drawback of this conventional method resides in an additional necessity of disposing the cooling dust removing tower with the intention of preventing the dust from contaminating the by-product gypsum. Further, as be apparent from FIG. 2, the operative steps such as the oxidation, the precipitation and concentration of the gypsum and the recovery of the supernatant liquid are required separately and they are additionally complicated, which fact is uneconomical. The most troublesome point is that the drain treatment is essential, and this is the largest drawback of the wet exhaust gas treatment.

Since impurities such as the dust, HCl and HF present in the exhaust gas are caught in the absorbing solution and are discharged with the drainage through a different route than that of the gypsum, the drain treatment is inevitable from the viewpoint of the prevention of a secondary environmetal pollution due to the drain. Even in the case that any concrete description of the drain treatment is not made in disclosures regarding the wet exhaust gas treating technique, it should be understood that the technique requires such a drain treatment naturally.

Additionally, another large drawback of the conventional process is that $SO_3$ in the exhaust gas cannot be removed therefrom, though $SO_2$ can be absorbed and removed therefrom.

$SO_3$ results from the oxidation of a part of a sulfur content at a combustion. In recent years, a denitrating device is often used, and by a secondary denitrating reaction, 0.5 to 4% of $SO_2$ is oxidized, so that an amount of $SO_3$ will increase. In consequence, the exhaust gas will contain 5 to 50 ppm of $SO_3$, depending upon the sulfur content in a fuel.

When a temperature of the exhaust gas is lowered by a heat exchanger such as an air heater, $SO_3$ is partially condensed to become a sulfuric acid mist, and the latter will adhere to the dust coming therewith. As a result, the dust will be acidic and will corrode the dry dust collector inconveniently at times.

The $SO_3$ gas which has passed through the dry collector becomes the sulfuric acid mist by a temperature drop of the exhaust gas in the exhaust gas desulfurizing apparatus, but the thus formed sulfuric acid mist is composed of fine particles. Therefore, a part of the mist will be discharged from the desulfurizing apparatus through a chimney, so that it will be a cause of acid smut or white smoke or will corrode materials of the heat exchanger attached to the desulfurizing apparatus and a flue inconveniently.

Heretofore, a process is now put into practice which comprises introducing $NH_3$ into an exhaust gas coming through an exit of a coal-fired air heater to form a reaction product (hereinafter referred to as the $NH_3$—$SO_3$ reaction product) of SO$_3$ and NH$_3$ such as acid ammonium sulfate (NH4HS04) or ammonium sulfate [(NH$_4$)$_2$SO$_4$], and collecting the thus produced NH$_3$—SO$_3$ reaction product in a dust collector at a downstream position ("Mitsubishi Heavy Industries Technical Bulletin", Vol. 10, No. 5, 1973, p. 211 to 218).

However, if this method is utilized to remove SO$_3$ in the exhaust gas containing a large amount of the dust from, for example, a coal-fired boiler, the following disadvantages will come out.

That is to say, both the NH$_3$—SO$_3$ reaction product and the dust are caught in the dust collector, and the treatment of the dust containing a great deal of the NH$_3$—SO$_3$ reaction product will be troublesome.

Heretofore, the dust discharged from the coal-fired boiler is effectively utilized as a material for a fly ash cement, or is thrown away for reclamation, but in the case of the former, an NH$_3$ odor will be generated in mixing with water and a strength will deteriorate; in the case of the latter, the NH$_3$ odor and a leak into underground water or the like will be problematical.

Furthermore, with regard to the exhaust gas from the heavy oil-fired boiler which is now brought into practical use, an amount of the dust is much smaller than in the exhaust gas from the coal-fired boiler, and thus the treatment of the dust containing the NH$_3$—SO$_3$ reaction product is relatively easy. However, when the large amount of the dust is present as mentioned above, a great deal of the dust must be treated disadvantageously.

In the treatment of the exhaust gas from the coal-fired boiler in which NH$_3$ cannot be used, the sulfuric acid mist will adhere to the collected dust in the dry collector as described above, so that the effective utilization of the dust might be obstructed. After all, with regard to the treatment for the exhaust gas containing the dust and SO$_3$ in addition to SO$_2$, any rational method has not been established yet.

The conventional wet lime/gypsum process desulfurizing method has at least the following drawbacks:

(1) The by-product gypsum is contaminated by the dust.

(2) In order to recover the dust-free by-product gypsum, the cooling dust removing tower has to be additionally disposed.

(3) In the course of from the absorption of SO$_2$ to its recovery as the by-product gypsum, it is necessary to separately arrange the operative steps of the oxidation, the precipitation and concentration of the gypsum, and the recovery of a supernatant liquid.

(4) The treatment of the drain containing impurities coming from the exhaust gas and the like is essential.

(5) SO$_3$ in the exhaust gas is converted into the sulfuric acid mist consisting of the fine particles by the drop in a gas temperature in the desulfurizing apparatus, but the thus formed mist cannot be removed. As a result, the mist will be a cause of acid smut or white smoke and will corrode materials inconveniently. The sulfuric acid mist will also adhere to the dust collected in the dry dust collector disposed on the upstream side of the wet exhaust gas desulfurizing device, and the effective utilization of the dust will be obstructed.

SUMMARY OF THE INVENTION

With the aim of overcoming the above-mentioned drawbacks, there have been conducted intensive researches on the rate of the reaction of a CaCO$_3$ or Ca(OH)$_2$ crystal with SO$_2$, the rate of the oxidation reaction of calcium sulfite produced by absorbing SO$_2$ and the sedimentation rates of a dust and a gypsum, and as a result, the present invention has been completed on the basis of the thus obtained data. In short, the present invention does not take the conventional notion of "one operation in one process" but unifies all the operations of an SO$_2$ absorption, an oxidation, the precipitation and concentration of a gypsum, the separation of a dust and the recovery of a supernatant liquid into one process in an absorbing tower and a tank in the absorbing tower. Therefore, the present invention provides a method which is characterized in that a slurry mainly containing gypsum particles and a slurry mainly containing a dust are separately taken out from the absorbing solution tank. That is to say, the present invention provides a method for treating an exhaust gas containing SO$_2$, SO$_3$ and a dust to separately recover a gypsum and the dust, the method being characterized by comprising the steps of adding an alkali to a slurry mainly containing the dust in order to form an alkaline dust slurry, spraying the thus formed alkaline dust slurry into a high-temperature exhaust gas on the upstream side of a dry dust collector in order to form a dry solid in which SO$_3$ in the exhaust gas is caught, and causing the exhaust gas to pass through the dry dust collector, whereby the dry solid is collected together with the dust.

According to the present invention, the fine dust which has passed through the dry dust collector is changed into the dust slurry and is then evaporated to dryness, and as a result, the fine particles of the dust are agglomerated to be rendered coarse. The coarse grains of the dust are then caused to pass through the dry dust collector again, and they are caught this time by the collector. In this case, the present invention can provide the great feature that the fixation and the neutralization of SO$_3$ are simultaneously accomplished. Furthermore, a drain from the exhaust gas desulfurizing apparatus can be well utilized for the fixation and the neutralization of SO$_3$, so that the process of the conventional exhaust gas desulfurizing apparatus can be simplified. In addition, the present invention can obtain features of recovering the dust-free by-product gypsum, and the like.

DESCRIPTION OF THE PREFERRED EMBODIMENTS

Figure 1:
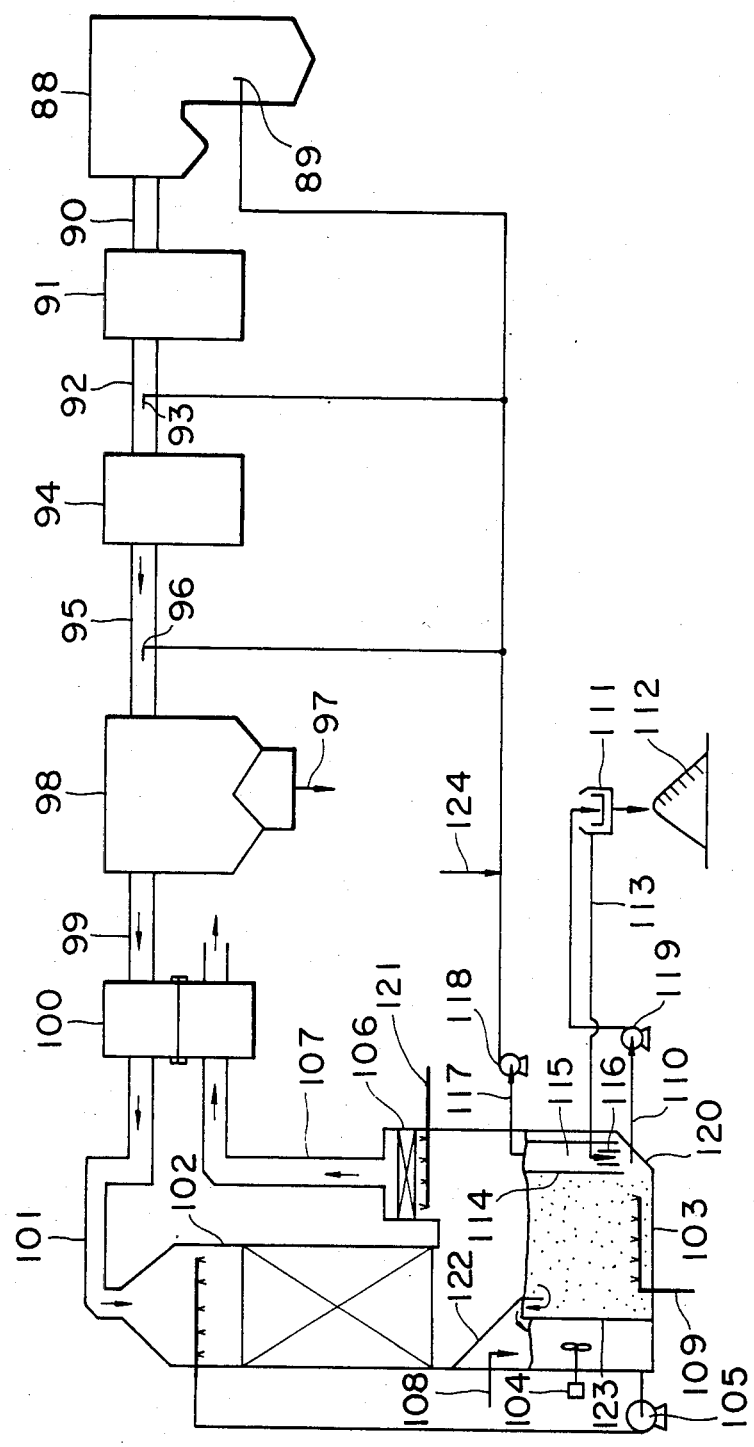
FIG. 1 is a flow sheet showing one embodiment of the present invention.

The present invention will be described in reference to FIG. 1.

An exhaust gas from a coal-fired boiler 88 is introduced via a flue 90 into a denitrating device 91, in which NOx in the exhaust gas is removed therefrom. Inclusive of SO$_3$ formed in this denitrating device 91, a concentration of the SO$_3$ gas in the exhaust gas in a flue 92 reaches a level of 5 to 50 ppm. Then, the exhaust gas is guided to an air heater, in which it is cooled from 300°–400° C. to 130°–180° C. for the recovery of heat. In consequence, in the air heater 94, a part of SO$_3$ is condensed at its dew point and becomes a sulfuric acid mist.

Figure 3:
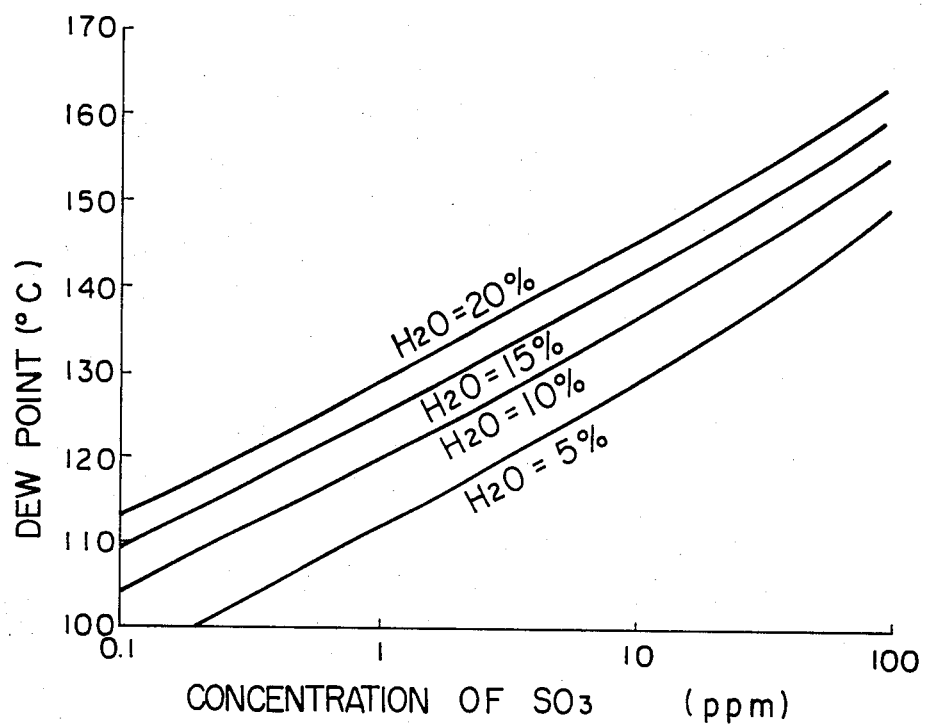
FIG. 3 is an equilibrium diagram showing relations between dew points of a sulfuric acid mist and concentrations of an SO$_3$ gas.

As be definite from FIG. 3 showing relations between dew points of the sulfuric acid mist and concentrations of the $SO_3$ gas, when a temperature of the gas is high, a dew point will not be reached even if a concentration of $SO_3$ is high. Accordingly, most of the $SO_3$ gas remains in the exhaust gas at an outlet of the air heater 94.

The sulfuric acid mist which has been condensed at the dew point adheres to the dust, and the latter thus becomes acidic at times and might corrode the materials of exhaust gas treating devices and flues at downstream positions. For the sake of preventing such a corrosion, an alkaline slurry which will be described below is sprayed through at least one of the spray nozzles 96, 93, 89 in order to remove the $SO_3$ gas and to neutralize and solidify the sulfuric acid mist. If the alkaline slurry is sprayed through these spray nozzles 89, 93, 96, an alkalinity of the dust will increase, so that even though the sulfuric acid mist adheres to the dust on the downstream side, the acidification of the dust can be prevented advantageously.

Afterward, the exhaust gas leaves the air heater 94 and is delivered through a flue 95 to a dry dust collector 98, in which most of the dust in the exhaust gas is removed therefrom. A concentration of the dust in the exhaust gas is about 10 $g/m^3N$ at an inlet of the dry dust collector 98 and about 500 $mg/m^3N$ at an outlet thereof.

Next, the exhaust gas is introduced via a flue 99 into a heat exchanger 100, in which it is cooled from about 140° C. to about 80° C. for heat recovery. In a conventional process, at this step, $SO_3$ is changed into the sulfuric acid mist, and the corrosion of materials and the generation of acid smut or white smoke take place inconveniently. However, in the present invention, $SO_3$ has already been neutralized and fixed, and been collected together with the dust in the dry dust collector 98, and thus such an inconvenience cannot occur.

Afterward, the exhaust gas containing about 500 $mg/cm^3N$ of the dust and about 1,500 ppm of $SO_2$ is guided to an absorbing tower body 102 through a flue 101. FIG. 1 shows the the case that the exhaust gas is brought into contact with the absorbing slurry in the manner of a so-called parallel flow, but it is also possible to employ such a counter flow gas/liquid contact system as shown in FIG. 2.

In the lower portion of the absorbing tower body 102, there is disposed a tank 103 for receiving a slurry in which calcium compounds are suspended. As seen in FIG. 1, the slurry is divided in the tank 103 by the use of divider plates 122 and 123, but these plates are dispensable. Particularly in the case that the divider plates are disposed, the slurry is stirred by means of a stirrer 104 to prevent a solid from precipitating, but in the case that they are not provided, occured air bubbles can stir the slurry, and thus the stierrer 104 can be omitted on occasion.

The slurry in which the calcium compounds are suspended is delivered to the top of the tower 102 by means of a circulating pump 105, is sprayed into the tower 102, flows down while brought into contact with the exhaust gas, and returns to the tank 103 again.

The exhaust gas in which $SO_2$ has been removed by the contact with the slurry is delivered to a heat exchanger 100 via a mist eliminator 106 and a flue 107, and after its temperature has been raised therein, it is discharged as a purified gas into the atmosphere. The purified gas in the flue 107 contains about 100 ppm or less of $SO_2$ and 50 $mg/m^3$ or less of the dust, which fact indicates that $SO_2$ and the dust have been caught by the absorbing slurry. Simultaneously, HCl and HF which have been present in an amount of several tens ppm in the exhaust gas are also almost caught by the absorbing slurry.

On the other hand, a powder of $CaCO_3$ or $Ca(OH)_2$ is fed to the tank 103 via a powder delivering line 108 in compliance with an amount of absorbed $SO_2$. $CaCO_3$ or $Ca(OH)_2$ which is an absorbing agent may be fed to the tank 103 in the form of a slurry prepared by suspending it into water.

Calcium sulfite produced by the absorption of $SO_2$ with the absorbing agent may be oxidized with oxygen contained in the exhaust gas in order to be all converted into a gypsum crystal at times, because the slurry is kept acidic in the parallel flow system gas/liquid contact zone. However, since the sulfite usually still remains therein, air is fed thereto through an air nozzle 109 so as to accelerate its oxidization and to thereby fix it in the form of the gypsum.

In the absorbing solution in the tank 103, there exist the slurry consisting mainly of the gypsum crystal which is the calcium compound and the dust caught by the absorbing solution. However, the dust in the tank 103 is that which has not been collected by the above-mentioned dry dust collector, and thus it is composed of fine particles each having a very small diameter as much as about 1 $\mu$m. These particles are in contrast to the gypsum grains each having a diameter of about 50 $\mu$m, and so the former are different from the latter in physical properties such as sedimentation rate and the like.

The present invention makes use of this physical difference and succeeds in the separation of the slurry consisting mainly of the gypsum grains and the slurry consisting mainly of the dust. That is to say, the slurry is guided through a slurry outlet 110 and a pump 119 to a separator 111, in which a gypsum cake 112 can be obtained, but it has been found that in this case, if a filter cloth is suitably selected and a feed time of the slurry is suitably regulated, the slurry consisting mainly of the dust of the fine particles can be recovered through a line 113, so that the gypsum cake 112 which scarcely contains the dust can be obtained.

However, the slurry in the line 113 contains the gypsum in addition to the dust, and it has been found that the adjustment of a concentration of this gypsum can hardly be controlled in practice.

In short, when a feed rate of the slurry to the separator 111 is too large, an amount of the dust contained in the gypsum cake will be small and the high-purity gypsum cake 112 can thus be recovered. However, the separated solution in the line 113 will be contaminated inevitably by the gypsum besides the dust, and the concentration of the gypsum will be difficult to control. According to such a manner, the dust will increase gradually in the tank 103. Therefore, the present invention makes use of the difference between the sedimentation rates of the dust and the gypsum and employs a new way of taking out the slurry mainly containing the dust through a line 117.

That is to say, a partition 114 is provided so as to extend from the surface of the slurry in the tank 103 toward its bottom and to thereby define a liquid chamber 115 separated from the slurry which is being stirred. A lower end portion of the partition 114 is opened so that the slurry being stirred by the stirrer 103 and the solution in the partition 114 may communicate with each other therethrough.

Figure 2:
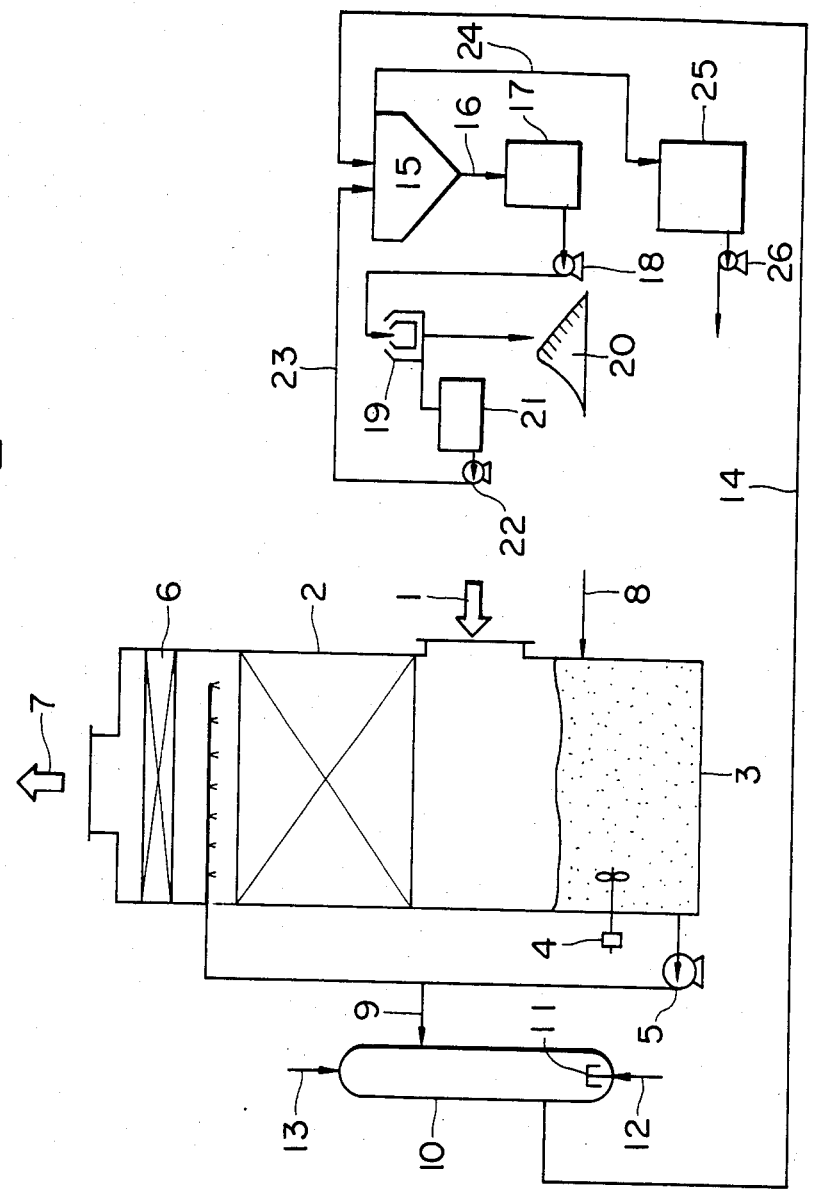
FIG. 2 is a schematic view of an exhaust gas desulfurizing apparatus utilizing a wet lime process which has heretofore been employed on an industrial scale.

Further, as in FIG. 1, a baffle 116 is provided so that the slurry mainly containing the dust in the liquid chamber 115 may not be disturbed by the turbulence of the slurry being stirred. The slurry mainly containing the dust in the liquid chamber 115 is then discharged through a dust slurry outlet 117 and a pump 118. The slurry returned through the line 113 is introduced into the liquid chamber 115 through its lower position in a downward direction so as to prevent the gypsum crystal from rising. A slurry discharge opening 110 is provided in a slant plate 120 constituting the bottom plate of the liquid chamber 115 on which the gypsum crystal precipitates and is concentrated.

By providing the slant plate 120 in such a way, a concentration of the gypsum crystal in the slurry which will be taken out by the pump 119 is heightened, whereby an extra energy for carrying the liquid can be saved.

On the other hand, the slurry discharged by means of the pump 118 mainly contains the dust, and in the slurry, there also exist soluble components such as HCl and HF in the form of $Cl^-$ and $F^-$ ions caught from the exhaust gas. Needless to say, when a saturated dissolution is reached, the gypsum component is also dissolved in the slurry. In former days, for the purpose of restraining the accumulation of such impurities, the latter are discharged from the system, and thus a drain treatment is essential for the prevention of a secondary environmental pollution. However, in the present invention, the exhaust gas desulfurizing absorbent such as $Ca(OH)_2$ or $CaCO_3$ is used in the slurry mainly consisting of the dust, or alternatively, an alkali such as $Na_2C_3$ or NaOH is added through an alkali feed line 124 and is then sprayed into a high-temperature gas of 130 to 180° C. through the spray nozzle 96 disposed in the flue 95. By this spray operation, the $SO_3$ gas in the exhaust gas is removed therefrom, and the sulfuric acid mist is neutralized in order to obtain a dry solid mainly containing the dust.

This dry solid is mainly composed of the fine dust passed through the dry dust collector 98 inherently, but since the evaporately dried dust is in a coarse state, it can be caught this time by the dry dust collector 98. This advantage can be achieved by the present invention, and since the fine dust which cannot be caught by the dry dust collector alone can be collected by the combination of the collector and the wet exhaust gas desulfurization technique, the dry dust collector can be more economical than in the conventional case. Other great features of the present invention are that the removal of the $SO_3$ and the neutralization and fixation of the sulfuric acid mist can be accomplished, and that the drain treatment which the conventional technique requires can be omitted.

The alkaline slurry consisting principally of the dust may be sprayed into the high-temperature exhaust gas by selectively utilizing spray nozzles 93, 89 other than the above-mentioned spray nozzle 96 in compliance with a concentration of $SO_3$ in the exhaust gas. That is to say, in order to bring most of the $SO_3$ gas into a dew point condensation in the air heater 94, the slurry is sprayed through the spray nozzle 93 and a temperature of the exhaust gas at the outlet of the air heater 94 is lowered to a level at which the $SO_3$ gas is scarcely present in the exhaust gas.

Further, in order to prevent materials from corroding due to a low alkalinity of the dust and thus due to the adhesion of the sulfuric acid mist to the dust, the spray nozzle 89 may be utilized together with the spray nozzle 93.

In the wet exhaust gas desulfurizing apparatus, wash water and/or sealing water for a pump may be caused to flow through a washing nozzle 121 so as not to clog a gas passage by the adhesion and deposition of the calcium compound crystal in the mist caught in the mist eliminator 106, and thus a great deal of water is used therein. Since acting as an outer turbulence on the slurry in the tank 103, the used water is drawn out as an excessive drain. In the case that an amount of the drain is too great, it may be dealt into the spray nozzles 89, 93, 96 in order to carry out the spray drying treatment. The alkali can be fed through the line 124 in an amount necessary to neutralize the sulfuric acid mist.

In the case that a side reaction product such as an $S_2O_6$ ion which can be decomposed at a high temperature is treated, the spray nozzle 89 is utilized, and on the contrary, in the case that compounds such as Cl and F which will be accumulated in the system due to the high-temperature decomposition are treated, the spray nozzle 89 is not utilized, and it is preferred that the spray nozzles 96 and/or 93 are suitably selected and employed.

EXAMPLE

The present invention was carried out by using an apparatus shown in FIG. 1.

A used tank 103 for storing a slurry containing a gypsum crystal had a sectional size of 2,000 mm × 2,000 mm and a depth of 2,000 mm. The slurry was sprayed into an absorbing tower 102 from its top at a flow rate of 60 m³/h by means of a circulating pump 105, the absorbing tower 102 being packed with a grid.

An exhaust gas was partially taken through an outlet of a coal-fired boiler 88 at a flow rate of 4,000 m³N/h, and it was introduced into the absorbing tower 102 through a flue 0, a denitrating device 91, a flue 92, an air heater 94, a flue 95, an electrical dust collector (EP) 100 for experiment and a heat exchanger 100. Adjustment was made so that a concentration of a dust in the exhaust gas at an inlet of the EP might be within the range of about 10 to 15 g/m³N and so that that of the dust in the exhaust gas at an outlet thereof might be at a level of about 500 mg/m³N.

The exhaust gas at the inlet of the absorbing tower 102 contained about 1,500 ppm of $SO_2$.

An absorbent comprising a $CaCO_3$ powder was fed to the tank 103 through a line 108 in compliance with an amount of absorbed $SO_2$, and a feed rate of the absorbent was finely controlled so that a pH of the slurry to be sprayed from the top of the absorbing tower 102 might become a suitable value within the range of 4.5 to 6.0.

In the tank 103, divider plates 122 and 123 were provided to divide a volume of the slurry in the tank into substantially two portions, whereby the circulating slurry coming down while absorbing $SO_2$ was brought into contact with air bubbles once and was then forwarded toward the circulating pump 105 in accordance with arrows in the drawing.

For experiments, in the tank 103, there was disposed in turn each of four cylindrical partitions 114 (length 1,500 mm; inner diameters 100, 200, 300 and 400 mm) having an opened bottom end.

A cylindrical upper lid is connected to a line 117 directly linked to a suction pump 118, and the slurry taken out from a liquid chamber 115 was sampled while its suction amount was suitably adjusted by the pump 118. A concentration of a solid in the slurry drawn out from the line 117 was adjusted to 0.2 to 3% by weight by changing, within the range of 0.1 to 3 m/h, an average rise flow velocity of the slurry in the liquid chamber 115 defined by the cylindrical partition 114. It was found from the observation by the use of a microscope that the slurry mainly contained the spherical dust and that when the rise flow velocity of the slurry was high, an amount of the mixed gypsum grains increased. During the experiments, a concentration of $SO_2$ contained in the exhaust gas in the flue 107 varied with a pH of the circulating slurry, but was within the range of 10 to 100 ppm, and a concentration of the dust was 30 mg/m$^3$N on the average. In a steady state, the gypsum recovered through a separator 111 had a high purity of 97% by weight or more in terms of dry weight, and it was confirmed that the dust could be selectively drawn out through the line 117.

During this operation, air was blown into the tank 103 through an air nozzle 109 disposed in the tank 103 at a feed rate of 50 to 600 m$^3$N/h, but at the feed rate of 250 m$^3$N/h or more, a concentration of a sulfite reached a lower level of less than 1 mmol/l. In the range of less than 250 m$^3$N/h, a concentration of a soluble sulfurous ion increased to 1 mmol/l or more along with the decrease in the feed rate of air. At this time, a pH of the absorbing solution began to fall and a dissolution rate of the $CaCO_3$ powder diminished, with the reslut that a concentration of unreacted $CaCO_3$ increased. For this reason, it was necessary to blow air thereinto at the feed rate of 50 m$^3$N/h or more.

Moreover, a concentration of the gypsum grains in the tank 103 could be controlled at a suitable level within the range of 1 to 35% by weight by adjusting a flow rate of the slurry discharged through a slurry discharge opening 110.

Next, $Ca(OH)_2$ was added to the slurry, mainly containing the solid dust, taken out through the line 117 by the pump 118, so that the slurry became alkaline. Afterward, the alkaline slurry was sprayed through a spray nozzle 96 into the flue 95 through which the exhaust gas having a temperature of about 170° C. flowed. A flow rate of the sprayed slurry was 50 l/h, but a temperature drop of the exhaust gas was about 10° C., and the slurry was collected in the form of a dried solid in an EP 98. A concentration of the $SO_3$ gas in the flue 95 was 10 ppm, but when $Ca(OH)_2$ was added through the line 124 at an equivalent 5 times as large as the $SO_3$ gas, the concentration of $SO_3$ in the flue 99 was 1 ppm or less, and it was thus confirmed that $SO_3$ was neutralized and fixed together with the dust in the EP 98.

Next, the slurry was sprayed into a flue 92, in which the exhaust gas at about 350° C. was flowing, through the spray nozzle 93 instead of the spray nozzle 96. In this case, the concentration of $SO_3$ in the exhaust gas in the flue 99 was 1 ppm or less, and even when the feed rate of $Ca(OH)_2$ to be added through the line 124 was lowered, the concentration of $SO_3$ in the flue 99 could be restrained at 1 ppm or less. It was thus confirmed that $SO_3$ was neutralized and fixed at the feed rate of $Ca(OH)_2$ equivalent to $S_3$.

According to the present invention, there can be advantageously omitted a cooling dust removing tower, an oxidizing tower, a thickener, a filtrate tank and a supernatant liquid tank provided in the conventional wet exhaust gas desulfurizing apparatus, and in addition, pumps, valves and metering members attached to these equipments are also unnecessary. Moreover, the drain treatment which is the most troublesome drawback of the wet exhaust gas desulfurization is also unnecessary, which fact permits simplifying the treating steps remarkably. Further, in the present invention, since the by-product gypsum and the dust can be directly and separately from the absorbing solution tank, the high-quality gypsum can be recovered, and since the slurry containing the dust is rendered alkaline and is then sprayed into the exhaust gas on the upstream side of the dry dust collector, the dust can be converted into the dry solid together with $SO_3$ and can be then caught by the dry dust collector effectively.

What is claimed is:

1. In a method for treating an exhaust gas which contains $SO_2$, $SO_3$ and dust wherein the gas is passed through a dry dust collector to remove most of the dust, the thus treated gas is treated in an absorbing device containing an absorbent selected from the group consisting of calcium hydroxide and calcium carbonate to remove $SO_2$ and remaining dust, the improvement which comprises the steps of blowing air into an absorbing solution fed to said gas absorbing device in order to oxidize said absorbing solution and to thereby form a gypsum therein; separating a part of said absorbing solution into a first slurry containing mainly said gypsum grains and a second slurry containing mainly said dust by utilizing the difference between the precipitation speeds of dust and gypsum particles in the slurry; obtaining said gypsum from said first slurry; adding an alkali to said second slurry; spraying the alkali second slurry into said exhaust gas on the upstream side of said dry dust collector; collecting, drying and solidifying $SO_3$; and collecting the resultant solid together with said dust with said dry dust collector.

2. A method for treating $SO_2$, $SO_3$ and a dust simultaneously according to claim 1 wherein said exhaust gas containing at least $SO_2$, $SO_3$ and said dust is an exhaust gas from a coal-fired boiler.

3. A method for treating $SO_2$, $SO_3$ and a dust simultaneously according to claim 1 or 2 wherein said exhaust gas is introduced into said dry dust collector through a denitrating device and an air heater.

4. A method for treating $SO_2$, $SO_3$ and a dust simultaneously according to claim 3 wherein said slurry mainly containing said dust to which an alkali has been added is sprayed into said exhaust gas between said air heater and said dry dust collector.

5. A method for treating $SO_2$, $SO_3$ and a dust simultaneously according to claim 4 wherein said slurry mainly containing said dust to which said alkali has been added is sprayed into said exhaust gas between said air heater and said denitrating device.

6. A method for treating $SO_2$, $SO_3$ and a dust simultaneously according to claim 4 or 5 wherein said slurry mainly containing said dust to which said alkali has been added is sprayed into a coal-fired boiler.

* * * * *